United States Patent
Narvaez-Guarnieri et al.

[11] Patent Number: 6,098,107
[45] Date of Patent: Aug. 1, 2000

[54] DYNAMIC ALGORITHMS FOR SHORTEST PATH TREE COMPUTATION

[75] Inventors: Paolo Narvaez-Guarnieri, Middlesex, Mass.; Hong-Yi Tzeng, Monmouth, N.J.

[73] Assignee: Lucent Technologies Inc., Murray Hill, N.J.

[21] Appl. No.: 08/961,736

[22] Filed: Oct. 31, 1997

Related U.S. Application Data

[60] Provisional application No. 60/056,027, Sep. 2, 1997.

[51] Int. Cl.[7] .................................................. G06F 15/173
[52] U.S. Cl. ......................... 709/239; 709/240; 709/242
[58] Field of Search ................................... 709/239, 240, 709/242, 241, 220

[56] References Cited

U.S. PATENT DOCUMENTS

| | | | |
|---|---|---|---|
| 4,905,233 | 2/1990 | Cain et al. | 370/237 |
| 4,987,536 | 1/1991 | Humblet | 709/241 |
| 5,570,466 | 10/1996 | Oechsle | 709/238 |
| 5,872,773 | 2/1999 | Katzela et al. | 370/256 |
| 5,881,243 | 3/1999 | Zaumen et al. | 709/241 |

*Primary Examiner*—Zarni Maung

[57] ABSTRACT

Method for computing a shortest path tree structure for nodes in an interconnected network comprising the steps of maintaining a data structure T consisting of a set of edges e interconnecting the plurality of nodes in the network, each node having an associated parent node and distance value attributes; determining a weight change $\Delta$ of an edge; obtaining a set of candidate nodes having associated parent and distance attributes that are affected by the weight change; selecting a node of the set of candidate nodes; identifying one or more descendents of the selected node and calculating a new distance attribute for each of the one or more descendents; searching for other nodes connected to the one or more identified descendent nodes and determining whether they should be included in the data structure T; and, repeating the selecting, identifying, calculating, searching and determining steps until all nodes of the set of candidate nodes are selected to update the data structure T.

13 Claims, 6 Drawing Sheets

125a {
STEP 1(a): Initialization
$\forall (n \in \mathcal{V}) \neq Source(G)$
  $P(n,\hat{t}) \leftarrow 0$
  $D(n,\hat{t}) \leftarrow \infty$
ENQUEUE $(0,(Source(G),(0,0)))$
} 100

125b {
STEP 1(b): Initialization
Edge $e$ increases its weight by $\Delta$
$W(e) \leftarrow W(e) + \Delta$
if $e$ is in $\hat{t}$
  $\forall n \in N (=B_{max}(E(e),\hat{t}))$
    $D(n,\hat{t}) \leftarrow D(n,\hat{t}) + \Delta$
  $\forall e \in 1(N)$
    $newdist \leftarrow D(S(e),\hat{t}) + W(e)$
    if $D(E(e),\hat{t}) > newdist$
      ENQUEUE $(0,(E(e),(S(e),newdist)))$
}

125c {
STEP 1(c): Initialization
Edge $e$ decreases its weight by $\Delta$:
$W(e) \leftarrow W(e) - \Delta$
$\Delta \leftarrow [D(S(e),\hat{t})+W(e)]-D(E(e),\hat{t})$
if $\Delta < 0$
  $\forall n \in N(=B_{max}(E(e),\hat{t}))$
    $D(n,\hat{t}) \leftarrow D(n,\hat{t}) + \Delta$
  $\forall e \in O(N)$
    $newdist \leftarrow D(S(e),\hat{t}) + W(e)$
    if $D(E(e),\hat{t}) > newdist$
      ENQUEUE $(0,(E(e),(S(e),newdist)))$
}

FIG. 3B

130 {
STEP 2: Node Selection
if $O = \emptyset$
  Terminate
else
  $\{y, (x,d)\} \leftarrow \text{EXTRACT}(O)$
  $P(y,\hat{t}) \leftarrow x$
  $\Delta \leftarrow (d-D(y,\hat{t}))$
}   100

140 {
STEP 3: Distance Update
$\forall n \in N = B(y,\hat{t})$
  $D(n,\hat{t}) \leftarrow D(n,\hat{t}) + \Delta$
}

150 {
STEP 4: Node Search
$\forall e \in O(N)$
  $newdist \leftarrow D(S(e),\hat{t}) + W(e)$
  if $D(E(e),\hat{t}) > newdist$
    $\text{ENQUEUE}(O,\{E(e),(S(e),newdist)\})$
}

160 { Go to Step 2

```
K ← {y}
N ← 0 step i)
if K = 0
      Stop
else
      k ← EXTRACT (K)
      N ← {N,k} step ii)
∀n∈B₁(k,↑)
      if n ∈ 0
            if (D(n,↑)+△ ≤ D(n,↑)
                  DEQUEUE(n,0)
                  K ← {K,n}
      else
            K ← {K,n}
go to step i)
```

DYNAMIC ALGORITHMS FOR SHORTEST PATH TREE COMPUTATION

RELATED APPLICATIONS

This application claims the benefit of provisional U.S. patent application Ser. No. 60/056,027 filed Sept. 2, 1997.

FIELD OF THE INVENTION

The present invention relates generally to algorithms for determining the routing of information data packets in a communications network, and particularly, a method implemented in a router for determining the shortest path for communicating packets to one of a plurality of interconnected routers in a communications network.

BACKGROUND OF THE INVENTION

In an interconnected communications network, e.g., the Internet, routing protocols are used by routers to decide where to forward packets of information, e.g., IP packets. Within each area of an autonomous system, an interior routing protocol computes the shortest path between any two routers in the area. The most widely used interior routing protocol is Open Shortest Path First (OSPF) such as described in J. Moy, OSPF Version 2, INTERNET DRAFT, rfc 2178, Jul. 1997 the contents and disclosure of which is wholly incorporated by reference as if fully set forth herein. Routers in an OSPF area exchange link state information periodically so that each router has a complete description of the topology of the area. Each router then computes the shortest path tree (SPT) from itself to every other router in the area by an algorithm, e.g., Dijkstra's algorithm, such as described in E. Dijkstra "A note two problems in connection with graphs," Numerical Mathematics, vol.1, 1959, p. 269–271, the contents and disclosure of which is wholly incorporated by reference as if fully set forth herein. The corresponding SPT is then used to build a routing table which contains the next hop for any destination.

Figure 1:
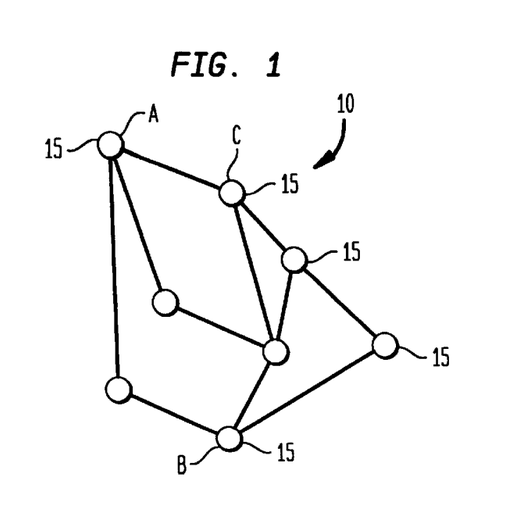
FIG. 1 illustrates an interconnected network of routers and connecting links.

To illustrate, as shown in FIG. 1, a network 10 comprises a set of nodes or routers 15. The shortest path will be computed from a source node, e.g., node "A", that sends a packet along one or more links 20 to a destination node, e.g., node "C". A weight (or distance) is associated with each link and the shortest path tree is computed from the knowledge of the sum of the weights associated with links comprising each of the various paths between the source and destination node. Some of the well-known computation algorithms for determining the shortest path trees is Dijkstra's algorithm, as mentioned above, the Bellman-Ford algorithm such as described in Richard Bellman, "On a Routing Problem," Quarterly of Applied Mathematics, vol. 16, 1958, p. 87–90, and, D'Esopo-Pape as described in D. Bertsekas *Linear Network Optimization: Algorithms and Codes* The MIT Press, Cambridge, Mass. The contents and disclosure of both of these references are incorporated herein by reference.

The characterization of each of these algorithms is as follows: When the topology of the area network 10 changes (a link fails, recovers, or changes its routing cost), every router in the area is notified of the change. After making the corresponding changes to its topology data structure, each router must recompute its SPT. Currently this recomputation is done by deleting the current SPT and rebuilding it from scratch again, e.g., by using any of the above-mentioned algorithms.

Current recomputation techniques implemented in routers are inefficient because they do not make use of the structure of the previous SPT and instead construct an entirely new SPT without using any information of the previous SPT trees. After a single link state change, the SPT does not usually change by much (oftentimes it does not change at all). By starting the calculation from scratch, OSPF has to recalculate all the parts of the SPT that need not change.

Given a router's topology data structure, it often contains multiple shortest path trees from the router itself. By starting the calculation from scratch, a router may choose a completely different SPT after link state updates, even thought the necessary changes to obtain a new SPT are just a few links. As a result of the completely different SPT, the traffic load in the network may become unstable, which is not a desirable phenomenon.

It would be highly desirable to implement an incremental shortest path computation algorithm that is fast and requires a minimum number of changes to the existing shortest path tree structure after a link state is updated.

Moreover, it would be highly desirable to transform conventional static shortest path tree computation algorithms into corresponding dynamic ones.

SUMMARY OF THE INVENTION

The invention relates to various algorithms that can be employed in Internet routers for dynamically updating the Shortest Path Tree structure after one or more link state changes. These dynamic algorithms use information of the old SPT and change only the part of the SPT that is affected by the state change. The object of dynamic shortest path algorithms is to minimize the number of computations required in order to update an SPT tree after a link state update.

In accordance with the principles of the invention, a first incremental method for conventional SPT algorithms is proposed that is dynamic and requires a fewer number of SPT changes as compared to the number of changes when computing a new SPT from scratch. Additionally, a second incremental method for conventional SPT algorithms is proposed that is dynamic and computes an SPT in a guaranteed minimum number of changes.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIGS. 3(*a*) and 3(*b*) illustrate the General Algorithm of the invention for computing SPT;

DETAILED DESCRIPTION OF THE INVENTION

The following terms are now defined that will be used throughout the rest of the description.

$G=(\upsilon,\xi)$ is a directed graph where $\upsilon$ is the set of nodes and $\xi$ is the set of edges on the graph. Source(G)$\in\upsilon$ is the root or source node.

For each directed edge $e \in \xi$, the following functions are defined:
1. W(e) is the weight or distance associated with e;
2. S(e) is the source node of edge e; and,
3. E(e) is the end node of edge e.

Figure 2:
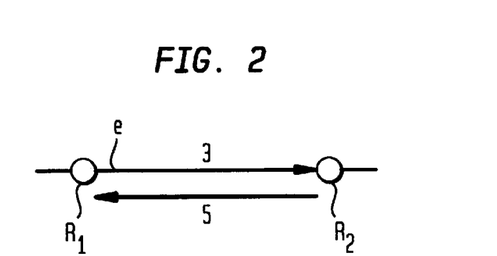
FIG. 2 illustrates a simple directed graph with two nodes and a directed edge having a weight attribute.

Reference is now had to FIG. 2, which illustrates two nodes and edge e of a directed graph with the weight W(e)=3, being the weight associated with edge e in the direction from source node R1 (S(e)=R1) to node R2 (E(e)=R2), and, the weight W(e)=5 being the weight associated with edge e in the direction from node R2 (S(e)=R2) to R1 (E(e)=R1).

Additionally, given a set of nodes N$\cup$V, the following functions are additionally defined:
4. I(N)={e$\in\xi$s.t.E(e)$\in$N} (the edges directed into the nodes in N) and
5. O(N)={e$\in\xi$s.t.S(e)$\in$N} (the edges directed out of the nodes in N). As will be explained, these five functions are only dependent on the topology of the network, and their values do not change during the execution of the algorithm.

A rooted tree T is a subgraph of G such that Source(G) is in T and every node in T is reachable from Source(G) through one unique path. Each node n in a tree T is associated with the of following attributes:

P(n,T) is the parent node of n; and

D(n,T) is the distance attribute of n, i.e., the distance from a source node to a node n in the tree. The structure of a tree mandates that calling P(n,T) recursively defines a unique path from any node in T to Source(G).

B(n,T) defines a set of nodes that are descendents of a node n (including n) in tree T. The different ways in which this function is defined (so that it includes more or less nodes) will lead to different incremental methods for solving the SPT. As examples, $B_{min}(n,T)$ denotes the smallest such function and consists of node n itself. Likewise, $B_1(n,T)$ denotes the children or direct descendents of n in tree T, while $B_{max}(n,Y)$ denotes node n as well as all its descendents on tree T.

A shortest path tree (SPT) is a tree such that the length of every path from some node in the tree to the source node is minimized. Since different paths to some node can have the same length, the SPT which contains the nodes in G is not unique. However, the length of the path from some node n $\in$ G to Source(G) through any SPT is unique.

The General Algorithm 100 of the invention is now presented that includes a class of well-known static SPT algorithms, such as the above-mentioned Bellman-Ford and Dijkstra. However, the General Algorithm has increased functionality in that it can compute the shortest path tree from a source node to every other node in the graph after a link change using information from the prior shortest path tree construction. The General Algorithm can also transform these static algorithms into dynamic versions. In particular, as shown in FIG. 3(a), depending on the initialization process of the General Algorithm, it can solve SPT problems from scratch (initialization 125a) or it can solve dynamic SPT problems (initialization 125b and 125c).

Figure 3A:
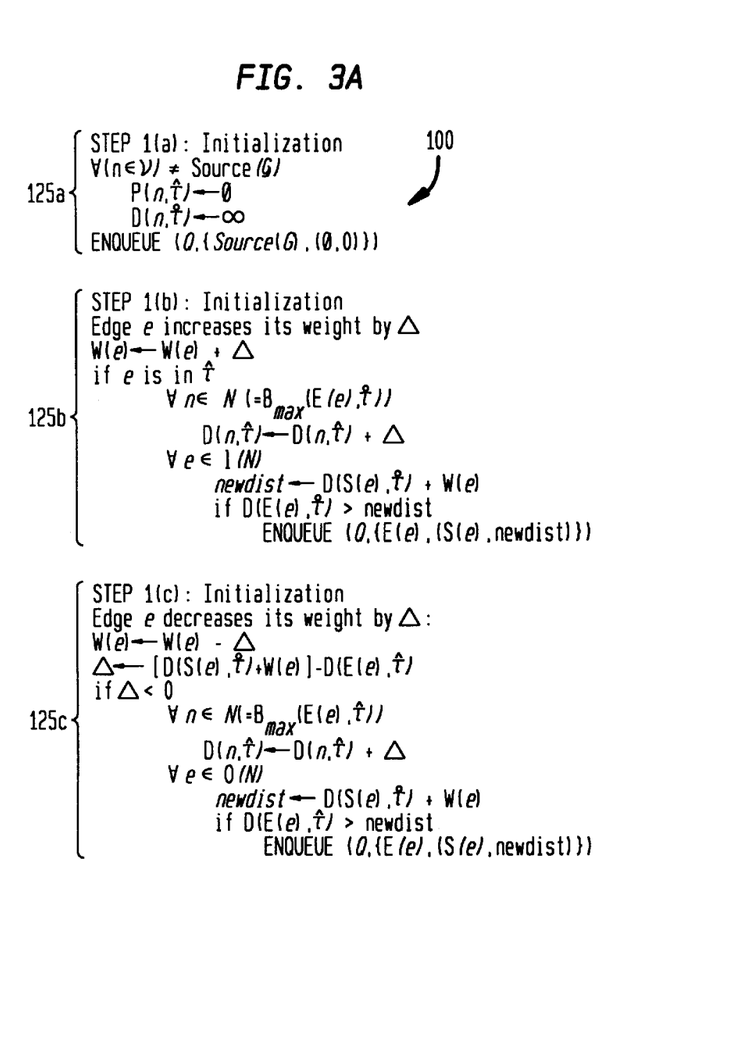

As shown in the pseudocode notation in FIG. 3(a), the initialization step of the General Algorithm computes a temporary list Q which stores nodes and two attributes associated with a node: 1) its parent node, p, and, 2) its distance, d, i.e., the length of the path between node n and source node Source(G). Specifically, the instruction ENQUEUE (Q,n(p,d)}) stores node n in Q along with attributes p and d (parenthood and distance). If node n is already in Q with attributes $P_{old}$ and $d_{old}$, the new attributes p, d) will replace the old ones only if the new distance d is less than $d_{old}$. At any instance, only one set of attributes can be stored for each node in Q. DEQUEUE(n,Q) removes node n and its attributes from Q. When an EXTRACT(Q) instruction is executed, a single element (node and its attributes) is selected from Q and removed from Q. The different implementation of these queuing functions will give rise to the different specific algorithms described herein.

The General Algorithm uses the tree T^ as the data structure to store information on the shortest path tree. Every node in G, along with some temporary attribute, is present in T^. This data structure T^ progressively changes during the computation, and at its completion, it contains one of the possible SPTs.

As mentioned above, conventional shortest path algorithms build an entirely new SPT without using any information of previous SPT trees. Thus, conventional methods implement initialization step 125a to erase any previous information stored in a tree, "T", i.e., the parenthood of each node is initialized to zero (0) and the distance attribute for each node is initialized to infinity ($\infty$). Particularly, when implementing the conventional initialization step 125a, only a source node Source(G) is enqueued, the source node being the ancestor of every node in a shortest path tree to be constructed from scratch. This ancestor node is referred to herein as a germinal node. Additionally, when using the conventional method, the branching function B(n,T) is defined as:

$$\forall n \in N, B(n,T)=B_{min}(n,T)=n. \quad (1)$$

In this way, the new SPT tree is constructed in T by changing the attributes of one node at a time for each iteration. The algorithms mentioned herein make use of this original method. The only differences between these algorithms reside on the different ways in which the temporary list Q is implemented. For instance, the easiest way of implementing the list Q is by using a FIFO queue. New nodes and their attributes are enqueued at bottom of the queue and extracted from the top of the queue. When this queuing discipline is used in the original method, it gives rise to the Bellman-Ford algorithm, such as described in the Richard Bellman reference "On a Routing Problem".

Another way of implementing Q is by using a queue where (as in Bellman-Ford's case) nodes are extracted from the top of the queue. However, unlike Bellman-Ford's case, a node is enqueued at the bottom of the queue only when that node has not been in the queue yet. If some node n has already been inserted and extracted from Q, the next time that n will be inserted in Q it will be at the top. In the original method, this queuing discipline gives rise to the D'Esopo-Pape algorithm, such as described in the above-mentioned reference *Linear Network Optimization: Algorithms and Codes*.

Yet another way of implementing Q is by using a priority queue where the node enqueued with the smallest distance attribute is always extracted first. In the original method, this algorithm is equivalent to the above-mentioned Dijkstra algorithm. The easiest way to implement the priority queue is to use a linked list where inserted nodes can be placed anywhere. The node with the smallest distance attribute is extracted by using a linear search. A more efficient way to implement the priority queue is to use a binary heap.

Figure 3B:
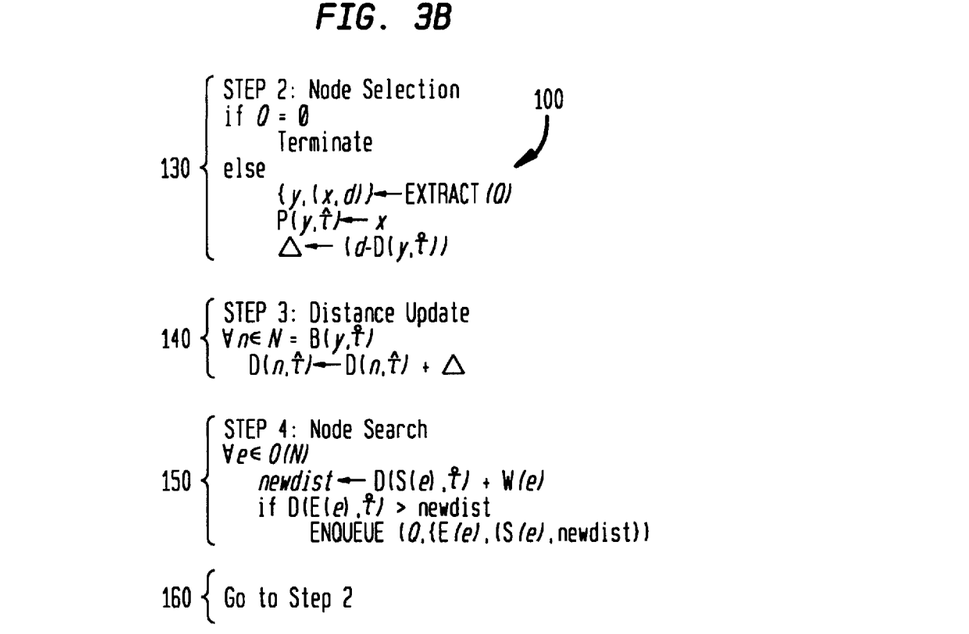

The incremental shortest path algorithms derived from the General Algorithm 100 of FIGS. 3(*a*) and 3(*b*), re-calculate the new SPT after some changes in the weights of the graph edges. Unlike the conventional (original) algorithms, the incremental ones use information from the outdated SPT to calculate the new one. Particularly, in the incremental method, a complete set of germinal nodes of D in some T∈ S are identified and enqueued in response to a change in the weight of a directed edge.

As shown in FIGS. 3(*a*) and 3(*b*), the General Algorithm 100 contains an initialization process 125*a,b,c,* and an iterative loop comprising steps 130–160, as shown in FIG. 3(*b*) to be described.

Specifically, in initialization step 125*b*, when an edge e increases its weight represented by a variable $\Delta$, e.g., the cost of forwarding a packet via edge increases, or the link (edge) is severed and its distance goes to infinity $\infty$, then the weight of that edge, W(e), is assigned the value of the old weight W(e) plus the weight change $\Delta$. If that edge e is already in the data structure T^, i e., the previous existing shortest path tree structure, then a set of selected descendent nodes from the end node connected to that edge is identified and are herein referred to as germinal nodes, i.e., all n∈ N(=$B_{max}$(E(e),T^) For each of these identified germinal nodes, the previous distance attribute, D(n,T^) to the source node is increased by the increased value $\Delta$. Then, for each of the source nodes S(e) having edges e directed into each of these identified germinal nodes, i.e., for all e ∈ I(N), a new distance attribute is computed such that "new distance"=D(S(e),T^)+W(e) where W(e) is the current weight of that edge directed into its respective germinal node. Finally, in initialization step 125*b*, an updating state is executed whereby a comparison is made between the distance attribute of the current end node (E(e)) and its new distance attribute "new distance" newly computed for that node. Thus, if D(E(e),T^)>"new distance" is satisfied, then this node is enqueued, i.e., the ENQUEUE(Q,{E(e),(S(e), new distance)}) step is performed to identify a set of nodes, Q, consisting of pairs E(e), S(e) and the new distance attribute of the edge e connecting these nodes. This set Q of enqueued nodes are possible candidate nodes that may be part of the new SPT structure.

In initialization step 125*c*, when an edge e decreases its weight represented by a variable $\Delta$, then the weight of that edge, W(e), is assigned the value of the old weight W(e) minus the weight change value $\Delta$. $\Delta$ is then assigned the value of the difference between the distance attribute of the source node S(e) of that edge e plus the edge's new weight W(e), and the old distance attribute D(E(e),T^) from the existing SPT. If this newly computed value for $\Delta$ is a negative value, then a set of selected germinal nodes from the end node connected to that edge e is identified, i.e., all n∈ N(=$B_{max}$(E(e),T^)) and for each of these identified germinal nodes, the previous distance attribute, D(n,T^), to the source node is increased by the value $\Delta$. Then, for each of the source nodes S(e) having edges e directed out from each of these identified germinal nodes, i.e., for all e ∈ O(N), a new distance attribute is computed such that "new distance" =D(S(e),T^)+W(e) where W(e) is the current weight of that edge directed out from its respective germinal node. Finally, in initialization step 125*b*, an updating state is executed whereby a comparison is made between the distance attribute of the current end node (E(e)) and its new distance attribute "new distance" newly computed for that node. Thus, if D(E(e),T^)>"new distance" is satisfied, then this node is enqueued, i.e., the ENQUEUE(Q,{E(e), (S(e), new distance)}) step is performed to identify a set of nodes, Q, consisting of pairs E(e), S(e) and the new distance attribute of the edge e connecting these nodes. As in step 125*b*, this set Q of enqueued nodes are possible candidate nodes that may be part of the new SPT structure.

After either initialization step 125*b* or 125*c*, the iterative loop comprising steps 130–160 as illustrated in FIG. 3(*b*) is entered. At step 130, each of the nodes from the enqueued candidate nodes Q are extracted for processing in accordance with a particular existing algorithm, shortest distance (Dykstra), FIFO (Bellman-Ford), etc. Specifically, the processing for each extracted node consists of updating its distance and parent attributes. If, after initialization there is nothing to update, then the algorithm is terminated. Otherwise, an extracted node y (corresponding to E(e) in the set Q) having an associated parent node x (corresponding to S(e) in set Q) and a distance attribute d (corresponding to "newdist" in the set Q) is extracted fromk Q. Specifically, the parent node of y, is first made equal to x, i.e., P(y,T^)=x. Then, a new delta $\Delta$ is computed that is equal to the distance "newdist" of the end node just extracted minus the current distance attribute of parent node y, i.e., D(y,T^), i.e., $\Delta$=d−D(y,T^). Then, as indicated at step 140, the algorithm proceeds to update the distance for either 1) all of the descendent nodes n of y, i.e., B(y,T^),2) some of the descendents of y, i.e., $B_1$(Y,T^), or 3) the node y itself, by assigning the old distance attribute for node n plus $\Delta$, i.e., D(n,T^)= D(n,T^) +$\Delta$. The choice of which descendent nodes to update determines the degree of incrementality for the original algorithms. For instance, updating the distance for the node y itself, results in the first incremental Dykstra, first incremental Bellman-Ford, methods.

Then, as indicated at step 150, the algorithm proceeds to search for the candidate nodes to be put into the SPT Q. Thus, for each edge e directed out of N, the new distance "newdist" is calculated as D(S(e),T^)+W(e), i.e., the distance at the source node S(e) is increased by the new weight change W(e). Then, a comparison is made between the distance attribute of the current end node (E(e)) and its new distance attribute "newdist" newly computed for that node. Thus, if D(E(e),T^)>"newdist" is satisfied, then this node is enqueued, i.e., the ENQUEUE(Q,{E(e), (S(e), new distance)}) step is performed to identify a set of nodes, Q, consisting of pairs E(e), S(e) and the new distance attribute of the edge e connecting these nodes.

Finally, the algorithm repeats by returning to step 130 to extract the next node (in accordance with the original extraction algorithm) and steps 130–150 are repeated until all the candidate nodes of Q have been processed (is equal to zero (ø)).

Thus, the above-mentioned original algorithms, e.g., Bellman-Ford, D'Esopo-Pape, etc. are transformed into their incremental versions by using initializations 125b and 125c instead of 125a (FIG. 3(a)). The branching function B(n,T) such as set forth in equation (1) can be the same as for the original method or may be varied in accordance with the degree of accuracy required or complexity tolerated.

Figure 4:
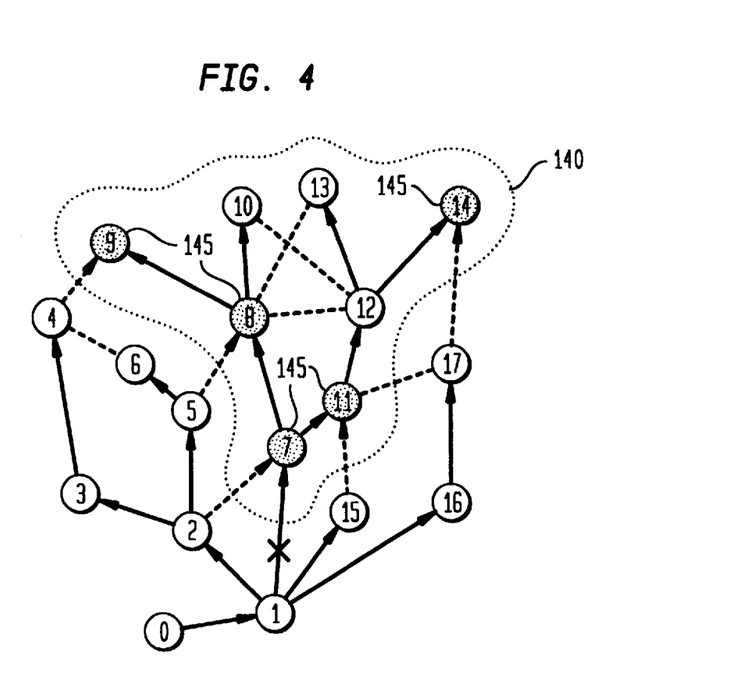
FIG. 4 illustrates the initialization step implemented by the general algorithm at the occurrence of a link failure at edge (1,7) in an example interconnected network.
Figure 5:
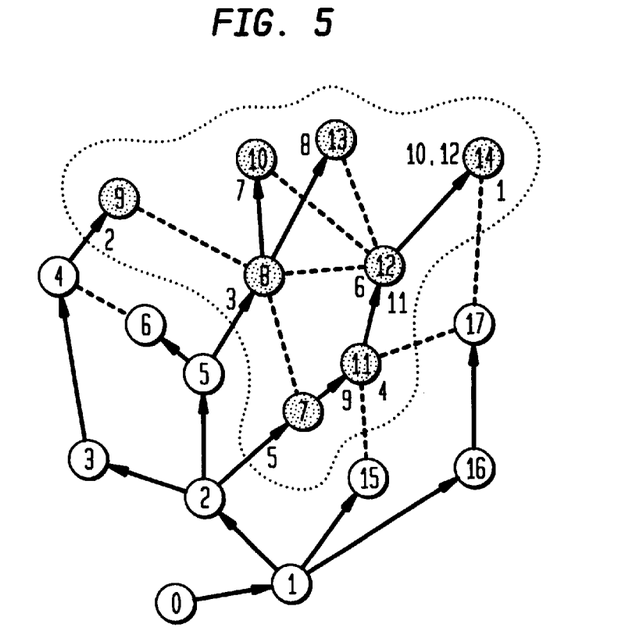
FIG. 5 illustrates the new SPT using Incremental Bellman-Ford for the link failure in the example network of FIG. 4.
Figure 6:
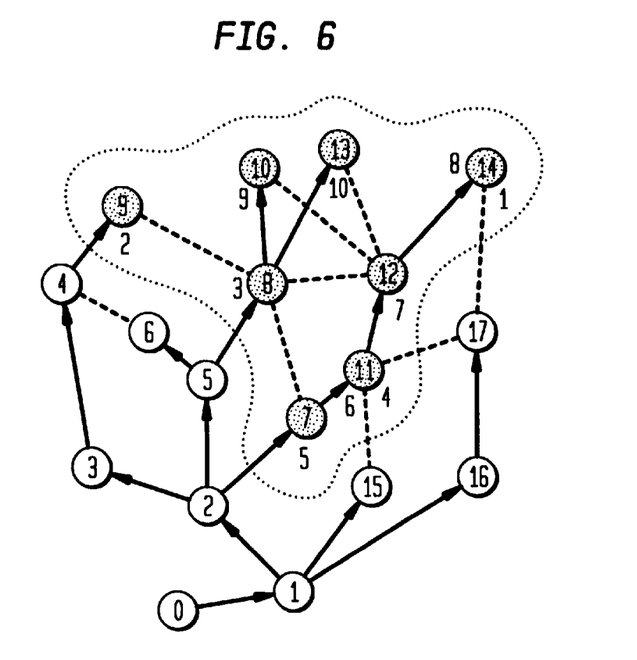
FIG. 6 illustrates the new SPT using Incremental D'Esopo-Pape for the link failure in the example network of FIG. 4.

FIGS. 4, 5 and 6 illustrate how the first incremental algorithms work on a simplified network. In FIGS. 4, 5 and 6, solid thick arrows between nodes represent the directed edges that are in current SPT, T^, and the thin dashed segments represent other edges in the network (G) that are not in T^.

Specifically, FIG. 4 shows how the general algorithm 100 is initialized utilizing step 125b of the general algorithm of FIG. 3(a) after a failure in the link between nodes 1 and 7 (link (1,7)). First link (1,7) is removed from G and T^ as its weight is equal to ∞. The dotted closed curve 140 includes the set of nodes (P), i.e., nodes 7–14, that are descendents of node 7. These are the nodes that might have their distance attribute increased as a result of the link failure. The nodes outside P, i.e., nodes 1–6 and 15–17 will be unaffected by the link failure. The shaded nodes 145 are the germinal nodes that are initially stored in Q as computed in the initialization step 125b. These nodes are necessarily the point of entry into P for all the paths in P. This initialization is the same for all the incremental methods and algorithms.

Recomputation of the SPT in accordance with the First Incremental Bellman-Ford algorithm is illustrated in FIG. 5. Specifically, for the First Incremental Bellman-Ford algorithm, the numbers next to each node indicate the order in which that node was extracted from Q with each number being placed next to the link indicating the parent attribute with which it was extracted. For example, as shown in FIG. 5, node 14 is the first node extracted from Q, and its parent attribute is node 17. The next node extracted is node 9 with parent attribute node 4. In accordance with Bellman-Ford, every node in P is extracted with a correct parent attribute, and T^ is the resulting SPT indicated by the solid arrows. It should be noted that with this algorithm, nodes 11,12, and 14 are extracted more than once. Since a node might be extracted with incorrect attributes, it will need to be enqueued and extracted again to obtain correct attributes. Additionally, it should be noted that the final parent attribute of node 13 has changed from node 12 (FIG. 4) to node 8.

FIG. 6 shows how the first Incremental D'Esopo-Pape method obtains a new SPT for the same simple network of FIG. 4. Some nodes are still extracted more than once, but the total number of extractions is less than in the Bellman-Ford case (10 extractions instead of 12). In the example shown in FIG. 6, the improvement is caused by the heuristics of D'Esopo-Pape. When node 6 is enqueued for a second time in Q, it receives first priority in Q so that it is extracted immediately after with correct attributes. Because node 6 is extracted earlier (extraction #6 rather than #9), it allows for nodes 12 and 14 to be extracted with correct attributes.

Figure 7:
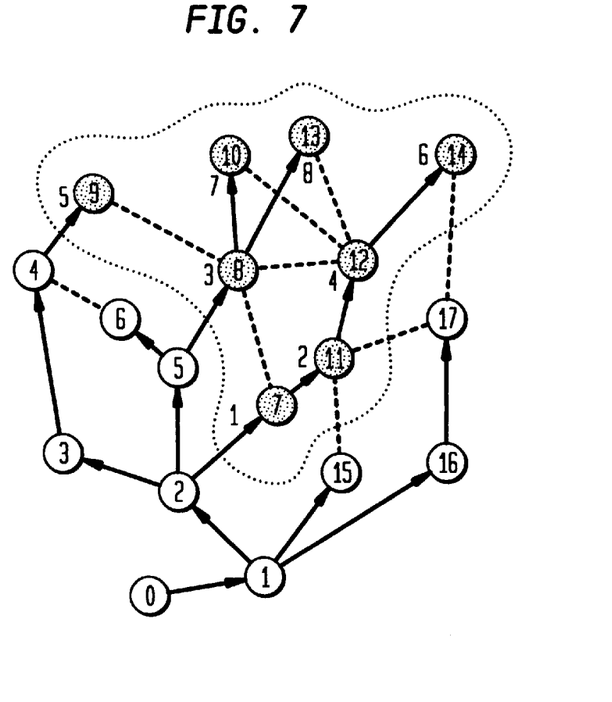
FIG. 7 illustrates the result of implementing the First Incremental Dijkstra algorithm for the link failure in the example network of FIG. 4.
Figure 8:
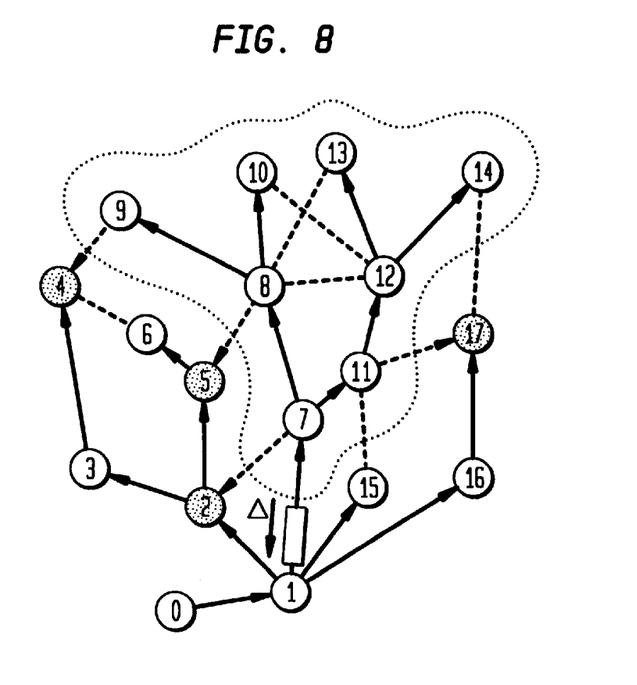
FIG. 8 illustrates the initialization step 125(c) implemented by the general algorithm at the occurrence of a cost improvement by some Δ of a link corresponding to edge (1,7) in the example interconnected network of FIG. 4.

FIG. 7 shows how the First Incremental Dijkstra algorithm obtains a new SPT for the same network of FIG. 4. Due to the order in which nodes are extracted (the node with the smallest distance attribute first), every node is extracted only once. Therefore, this algorithm performs the minimum number of extractions. The cost of this improvement is that some sort of searching data structure is needed in order to find the node with the smallest distance attribute in On the other hand, FIG. 8 shows how the general algorithm is initialized when edge (1,7) decreases its cost by some Δ. The set of nodes inside the dotted closed curve (set P) will have their distance attributes decreased by Δ, but the SPT structure inside P will remain unchanged. Only the nodes outside of P might have to change parent attributes in order to maintain optimal distances. In this case, the shaded nodes can decrease their distance label by changing their parent attribute to some node in P (indicated by the thin arrow). These nodes are the germinal nodes since all SPT paths from P to outside P must necessarily pass through them. Node 15 is not a germinal node because although it can have a parent in P, its distance label would not decrease if such a thing happened. All the germinal nodes are inserted in the candidate list Q.

Figure 9:
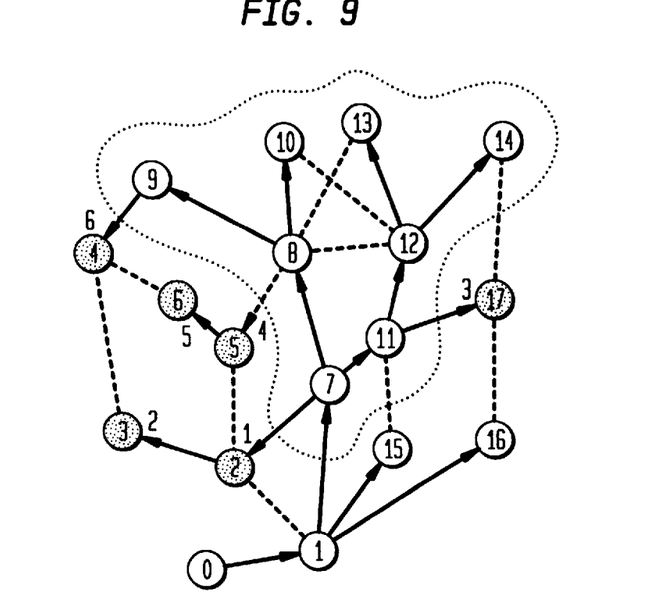
FIG. 9 shows how the First Incremental Dijkstra algorithm reconstructs a SPT after the initialization in FIG. 8.

FIG. 9 shows how the First Incremental Dijkstra algorithm reconstructs a SPT after the initialization in FIG. 8. Each number next to a node represents the order and the parent attribute of the extracted nodes. Once again, this algorithm only extract each node once from Q. The shaded nodes have all been visited by the algorithm and have had their distance attribute decreased. The other nodes outside of P that are not shaded are the nodes that could not decrease their distance attribute, and therefore, they are not affected by the algorithm.

It should be understood that after implementing the steps of the general algorithm (FIGS. 3(a) and 3(b)), the set of nodes remaining in Q represent the new SPT structure given that each node has parent node and distance attributes as computed.

Figure 10:
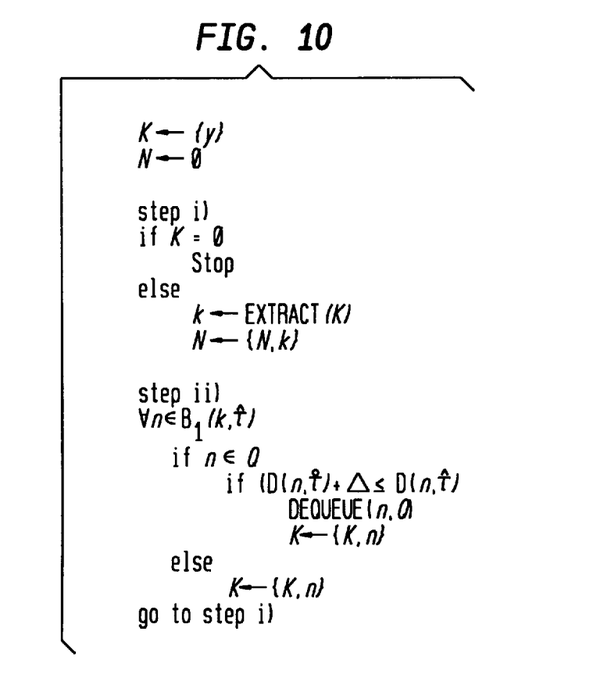
FIG. 10 illustrates the modification of the general algorithm when implementing the Second Incremental Dijkstra algorithm.

Furthermore, as described herein, another set of incremental algorithms, the second incremental method, can be obtained by changing the branching function B(n,T) so that it includes as many descendents as possible. The only nodes that should not be included in B(n,T) are those that will be directly affected by some node extraction from Q. Likewise, every node included in B(n,T) must be removed from Q. To specify exactly how the selection of the nodes in B(n,T) is done, the algorithm presented in FIG. 10 defines the set N=B(y,T^). In FIG. 10, the variable N contains the result of B(y,T^) after the STOP. K is a temporary variable that contains a list of nodes to be visited. Initially, K contains only the node y, and N is empty. In step i) of FIG. 10, if K is empty, then N contains the result of B(y,T^); otherwise, one node k is taken out of list of nodes K and is added in the set N. In step ii), every immediate descendent node 'n' of the node k is visited and at each iteration a determination is made as to whether n is in Q. If n is not in Q, then n is added into the set N; otherwise, if D(n,T^)+Δ is less than or equal to D(n,T^), then n is removed from Q and is added to the set N. Steps i) and ii) in FIG. 10 are repeated until K is empty.

This method is the second incremental method and its four algorithms are referred to as "Second Incremental Bellman-Ford," "Second Incremental D'Esopo-Pape," "Second Incremental Linear Dijkstra," and "Second Incremental Heap Dijkstra."

The first incremental method changes the attributes of only one node for each iteration. The second incremental method is less conservative since at each iteration an entire branch of T^ changes its attributes.

For example, FIG. 10 shows how the Second Incremental Dijkstra algorithm obtains a new SPT after the initialization in FIG. 4. First node 7 is extracted from Q with node 2 as its parent attribute. All the descendents of node 7 (nodes next to number 1) have their distance labels updated. Then node 8 is extracted with node 5 as its parent attribute; all its descendents (nodes next to number 2) have their distance labels updated. Finally node 9 is extracted with node 4 as parent attribute. Each node is at most extracted once from Q (there are only three extractions in this case). Nevertheless, because of the distance updates, some nodes (8,9, and 10) are visited more than once by the algorithm. The advantage of the second incremental method over the first one (shown in FIG. 7) is that even though some nodes are visited more than once, the candidate list Q is much smaller and simpler, less search operations are needed, and most visited nodes only require a simple distance attribute update.

Another advantage of this method is that it changes the minimum number of parent attributes. Node 13 maintains node 12 as its parent attribute and does not change it to node 8 as in the first incremental method.

Figure 11:
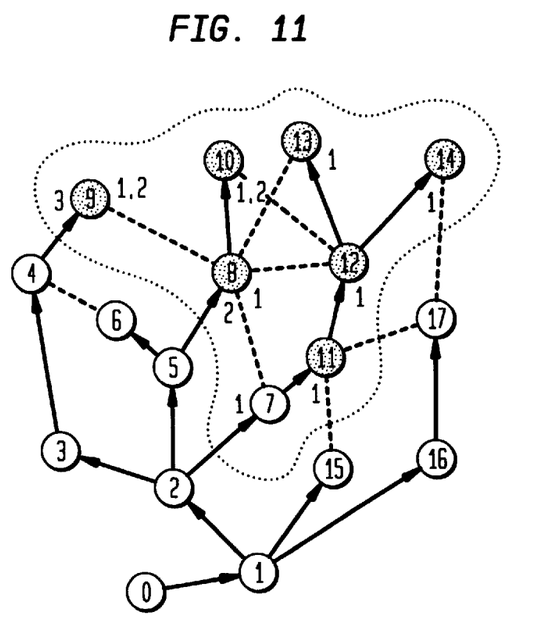
FIG. 11 illustrates the result of implementing the Second Incremental Dijkstra algorithm for the link failure in the example network of FIG. 4.
Figure 12:
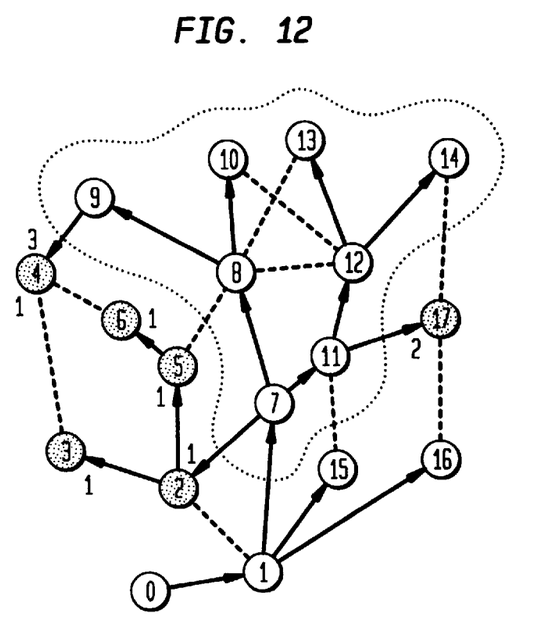
FIG. 12 illustrates the result of implementing the Second Incremental Dijkstra algorithm at the occurrence of a cost improvement by some Δ of a link corresponding to edge (1,7) in the example interconnected network of FIG. 4.

Finally, FIG. 11 shows the new SPT calculated by the Second Incremental Dijkstra algorithm after the initialization shown in FIG. 8. Once again, the minimum number of parent attribute changes are made.

The foregoing merely illustrates the principles of the present invention. Those skilled in the art will be able to devise various modifications, which although not explicitly described or shown herein, embody the principles of the invention and are thus within its spirit and scope. For instance, other incremental methods can be devised by defining a branching function that selects more nodes than $B_{min}$ and less than $B_{max}$ which may be more efficient than the first incremental method.

What is claimed is:

1. Method for dynamically updating a shortest path tree structure of a root node in a network of interconnected nodes and edges after a change in said network's topology, said method comprising the following steps:

step for initializing a data structure with information describing the shortest path tree of said root node prior to said change and with information describing the change; and step for applying a general algorithm to said initialized data structure, said general algorithm being capable of computing an updated shortest path tree from the information describing the shortest path tree of said root node prior to said change and the information describing the change.

2. Method according to claim 1, wherein said general algorithm is Bellman-Ford algorithm.

3. Method according to claim 1, wherein said algorithm is D'Esopo-Pape algorithm.

4. Method according to claim 1, wherein said algorithm is Dijkstra algorithm.

5. Method according to claim 1, wherein said algorithm is Dijkstra algorithm using a binary heap.

6. Method for dynamically updating a shortest path tree structure of a root node in a network of interconnected nodes and edges, each said interconnected node being associated with a distance variable, each said edge being directed from its associated source node to its associated end node, each said edge being associated with a weight, said method for use after a topology change in said network that can be described by an increment in weight associated with a first edge directed from a first node to a second node, said method comprising the steps of:

increasing the weight associated with said first edge by said increment;

selecting nodes for a first set of nodes from said interconnected nodes, each selected node being a descendent of said second node, said first set including all descendents of said second node;

adding, for each node of said first set, said increment to a distance variable associated with said each node of said first set;

selecting edges for a second set of edges from said edges of said network, said second set of edges comprising edges directed into the selected nodes;

computing for each edge of said second set an associated newdist variable, said newdist variable associated with said each edge of said second set being equal to a sum of the increased weight associated with said first edge and a distance variable of a source node associated with said each edge of said second set;

comparing, for said each edge of said second set, said newdist variable associated with said each edge of said second set and a distance variable of an end node associated with said each edge of said second set;

including, in a list Q of nodes with their respective parent and distance attributes, an entry corresponding to said each edge of said second set, if said distance variable of the end node associated with said each edge of said second set is greater than said newdist variable associated with said each edge of said second set, wherein said entry corresponding to said each edge of said second set includes:

the entry's node being said end node associated with said each edge of said second set, the entry's parent attribute being said source node associated with said each edge of said second set, and the entry's distance attribute being said newdist variable associated with said each edge of said second set; and processing said list Q in accordance with a first predetermined algorithm for computing shortest path trees to obtain an updated shortest path tree structure for said root node.

7. Method according to claim 6, wherein said processing step includes performing the following steps if said list Q is not empty:

(a) extracting an entry from said list Q;

(b) assigning the extracted entry's parent attribute as a parent attribute of the extracted entry's node in said updated shortest path tree structure;

(c) calculating a delta quantity, said delta quantity being equal to a difference between (1) the extracted entry's distance attribute, and (2) the extracted entry's node's distance variable;

(d) choosing nodes for a third set of nodes from said interconnected nodes by applying a branching function to the extracted entry's node, each chosen node being a descendent of the extracted entry's node;

(e) adding, for each node of said third set, the delta variable to a distance variable of said each node of said third set;

(f) choosing edges for a fourth set of edges from said edges of said network, said fourth set of edges comprising edges directed out of the chosen nodes;

(g) computing for each edge of said fourth set an associated newdist2 variable, said newdist2 variable associated with said each edge of said fourth set being equal to sum of the increased weight associated with said first edge and a distance variable of a source node associated with said each edge of said fourth set;

(h) comparing, for said each edge of said fourth set, said newdist2 variable associated with said each edge of said fourth set and a distance variable of an end node associated with said each edge of said fourth set;

(i) adding to said list Q an entry corresponding to said each edge of said fourth set, if said distance variable of the end node associated with said each edge of said fourth set is greater than said newdist2 variable associated with said each edge of said fourth set, wherein said added entry corresponding to said each edge of said second set includes:

the added entry's node being said end node associated with said each edge of said fourth set, the added entry's parent attribute being said source node associated with said each edge of said fourth set, and the added entry's distance attribute being said newdist2 variable associated with said each edge of said fourth set; and (j) repeating said steps (a) through (i) until said list Q has no entries.

8. Method according to claim 7, wherein said branching function selects one node.

9. Method according to claim 7, wherein said branching function selects all descendants of a node to which it is applied.

10. Method for dynamically updating a shortest path tree structure of a root node in a network of interconnected nodes and edges, each said interconnected node being associated with a distance variable, each said edge being directed from its associated source node to its associated end node, each said edge being associated with a weight, said method for use after a topology change in said network that can be described by a decrement in weight associated with a first edge directed from a first node to a second node, said first node associated with a first distance variable, said second node associated with a second distance variable, said method comprising the steps of:

decreasing the weight associated with said first edge by said decrement;

calculating a delta quantity, said delta quantity being equal to difference between (1) sum of the decreased weight associated with said first edge and said first distance variable, and (2) said second distance variable;

performing the following steps if said delta quantity is less than zero:

selecting nodes for a first set of nodes from said interconnected nodes by applying a branching function to said second node, each selected node being a descendent of said second node, adding, for each node of said first set, said delta quantity to a distance variable associated with said each node of said first set, selecting edges for a second set of edges from said edges of said network, said second set of edges comprising edges directed out of the selected nodes, computing for each edge of said second set an associated newdist variable, said newdist variable associated with said each edge of said second set being equal to a sum of the decreased weight associated with said first edge and a distance variable of a source node associated with said each edge of said second set, comparing, for said each edge of said second set, said newdist variable associated with said each edge of said second set and said a distance variable of an end node associated with said each edge of said second set, and including, in a list Q of nodes with their respective parent and distance attributes, an entry corresponding to said each edge of said second set, if said distance variable of the end node associated with said each edge of said second set is greater than said newdist variable associated with said each edge of said second set, wherein said entry corresponding to said each edge of said second set includes:

said end node associated with said each edge of said second set, said source node associated with said each edge of said second set as a parent attribute of said end node associated with said each edge of said second set, and said newdist variable associated with said each edge of said second set as a distance attribute of said end node associated with said each edge of said second set; and processing said list Q in accordance with a first predetermined algorithm for computing shortest path trees to obtain an updated shortest path tree structure for said root node.

11. Method according to claim 10, wherein said processing step includes performing the following steps if said list Q is not empty:

(a) extracting an entry from said list Q;

(b) assigning the extracted entry's parent attribute as a parent attribute of the extracted entry's node in said updated shortest path tree structure;

(c) calculating a delta2 quantity, said delta2 quantity being equal to a difference between (1) the extracted entry's distance attribute, and (2) the extracted entry's node's distance variable;

(d) choosing nodes for a third set of nodes from said interconnected nodes by applying a branching function to the extracted entry's node, each chosen node being a descendent of the extracted entry's node;

(e) adding, for each node of said third set, the delta2 variable to a distance variable of said each node of said third set;

(f) choosing edges for a fourth set of edges from said edges of said network, said fourth set of edges comprising edges directed out of the chosen nodes;

(g) computing for each edge of said fourth set an associated newdist2 variable, said newdist2 variable associated with said each edge of said fourth set being equal to sum of the decreased weight associated with said first edge and a distance variable of a source node associated with said each edge of said fourth set;

(h) comparing, for said each edge of said fourth set, said newdist2 variable associated with said each edge of said fourth set and a distance variable of an end node associated with said each edge of said fourth set;

(i) adding to said list Q an entry corresponding to said each edge of said fourth set, if said distance variable of the end node associated with said each edge of said fourth set is greater than said newdist2 variable associated with said each edge of said fourth set, wherein said added entry corresponding to said each edge of said second set includes:

the added entry's node being said end node associated with said each edge of said fourth set, the added entry's parent attribute being said source node associated with said each edge of said fourth set, and the added entry's distance attribute being said newdist2 variable associated with said each edge of said fourth set; and (j) repeating said steps (a) through (i) until said list Q has no entries.

12. Method according to claim 11, wherein said branching function selects one node.

13. Method according to claim 11, wherein said branching function selects all descendants of a node to which it is applied.

* * * * *